United States Patent
Yuan et al.

(10) Patent No.: US 7,255,838 B2
(45) Date of Patent: Aug. 14, 2007

(54) APPARATUS WITH NANO-SIZED PLATINUM BLACK AND OXYGEN-RICH CERAMIC POWDER FOR FILTERING THE INCOMING AIR INTO AN INTERNAL COMBUSTION ENGINE

(76) Inventors: Andy Yuan, 4th Fl., No.3, Sublane 7, Lane 257, Li Nung Street, Sec. 1, Taipei City (TW); Huan-Pien Li, 11F-5, No.64, Tzu Yu Road, YungHo City, Taipei Hsien (TW)

( * ) Notice: Subject to any disclaimer, the term of this patent is extended or adjusted under 35 U.S.C. 154(b) by 359 days.

(21) Appl. No.: 10/944,732

(22) Filed: Sep. 21, 2004

(65) Prior Publication Data

US 2006/0059876 A1    Mar. 23, 2006

(51) Int. Cl.
*B01D 46/00*    (2006.01)

(52) U.S. Cl. .................. 422/177; 55/482; 55/485; 55/486; 55/491; 55/523; 55/DIG. 30

(58) Field of Classification Search .......... 55/522, 55/523, 315, 318, 320–323, 332, 385.1, 385.3, 55/482, 483, 485–488, DIG. 28, 490–511; 123/198 E; 95/273, 285–287; 422/177
See application file for complete search history.

(56) References Cited

U.S. PATENT DOCUMENTS

| | | | | |
|---|---|---|---|---|
| 5,800,588 A * | 9/1998 | Miller | ................. | 55/494 |
| 5,877,105 A * | 3/1999 | Iwai et al. | ................. | 501/105 |
| 6,083,860 A * | 7/2000 | Matsuo et al. | ................. | 501/92 |
| 6,319,307 B1 * | 11/2001 | Shanks et al. | ................. | 55/493 |
| 6,340,066 B1 * | 1/2002 | Dettling et al. | ............ | 55/385.3 |
| 6,494,940 B1 * | 12/2002 | Hak | ..................... | 55/491 |
| 6,811,588 B2 * | 11/2004 | Niakin | ................. | 55/385.3 |
| 7,112,237 B2 * | 9/2006 | Zeller et al. | ................. | 95/273 |
| 2004/0217049 A1 * | 11/2004 | Bayer et al. | ................. | 55/522 |
| 2005/0042151 A1 * | 2/2005 | Alward et al. | ............ | 422/177 |
| 2005/0142042 A1 * | 6/2005 | LaBarge et al. | ............ | 422/177 |
| 2006/0057046 A1 * | 3/2006 | Punke et al. | ................. | 422/177 |
| 2006/0213187 A1 * | 9/2006 | Kupe et al. | ................. | 60/286 |

* cited by examiner

*Primary Examiner*—Duane Smith
*Assistant Examiner*—Robert Clemente
(74) *Attorney, Agent, or Firm*—Rosenberg, Klein & Lee

(57) ABSTRACT

An air filter for an internal combustion engine having a rigid type ceramic filter element made by foaming oxygen-rich ceramic powder for creating a plurality of pass-through holes. In this way, the incoming air obtains a thorough contact with the oxygen-rich powder. Meanwhile, the material of the oxygen-rich ceramic releases negative ions to activate the air entering into the internal combustion engine. Moreover, nano-sized platinum black is coated to the surface of the pass-through holes of the ceramic filter element. So, the incoming air passing through the pass-through holes of the ceramic filter element is catalyzed in chemical reactions to divide the water molecule cluster into smaller particles. Meanwhile, the freedom of water molecule is increased to permit an instant decomposition of oxygen and nitrogen molecules, a complete combination with the fuel injected into the internal combustion engine, and a thorough mixing and a better combustion efficiency.

5 Claims, 5 Drawing Sheets

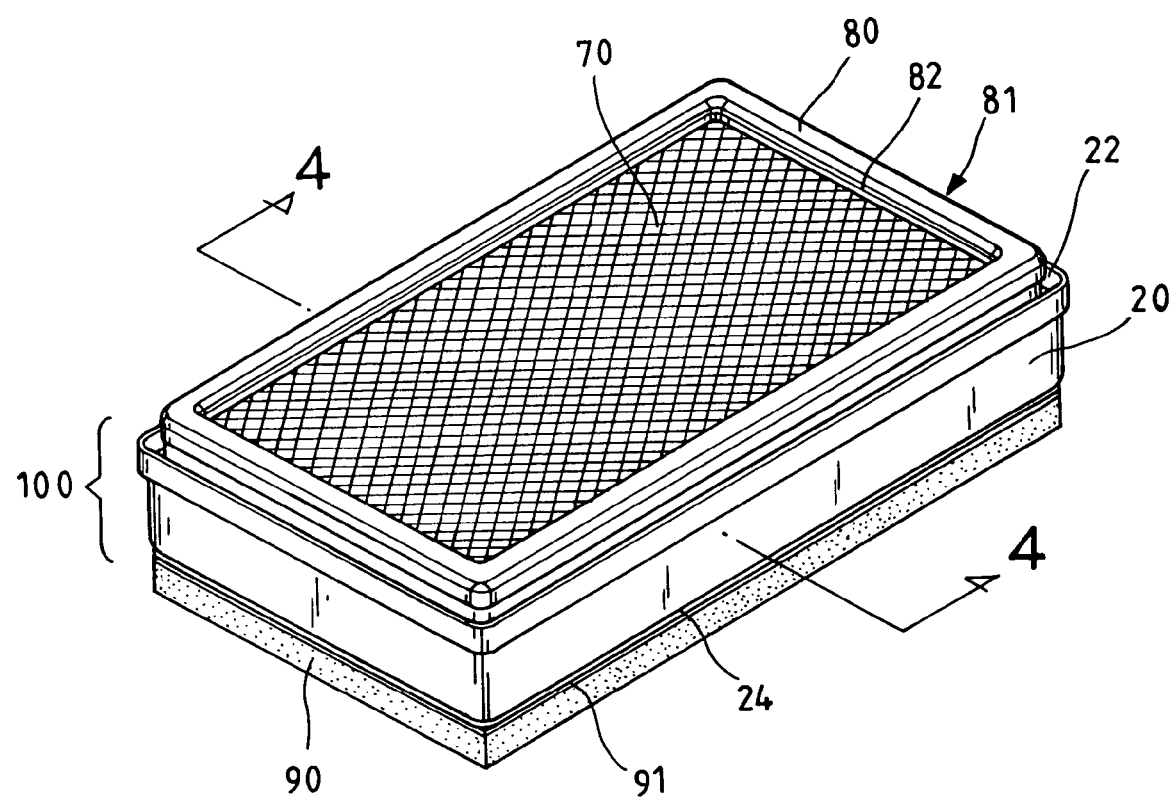
F I G. 3

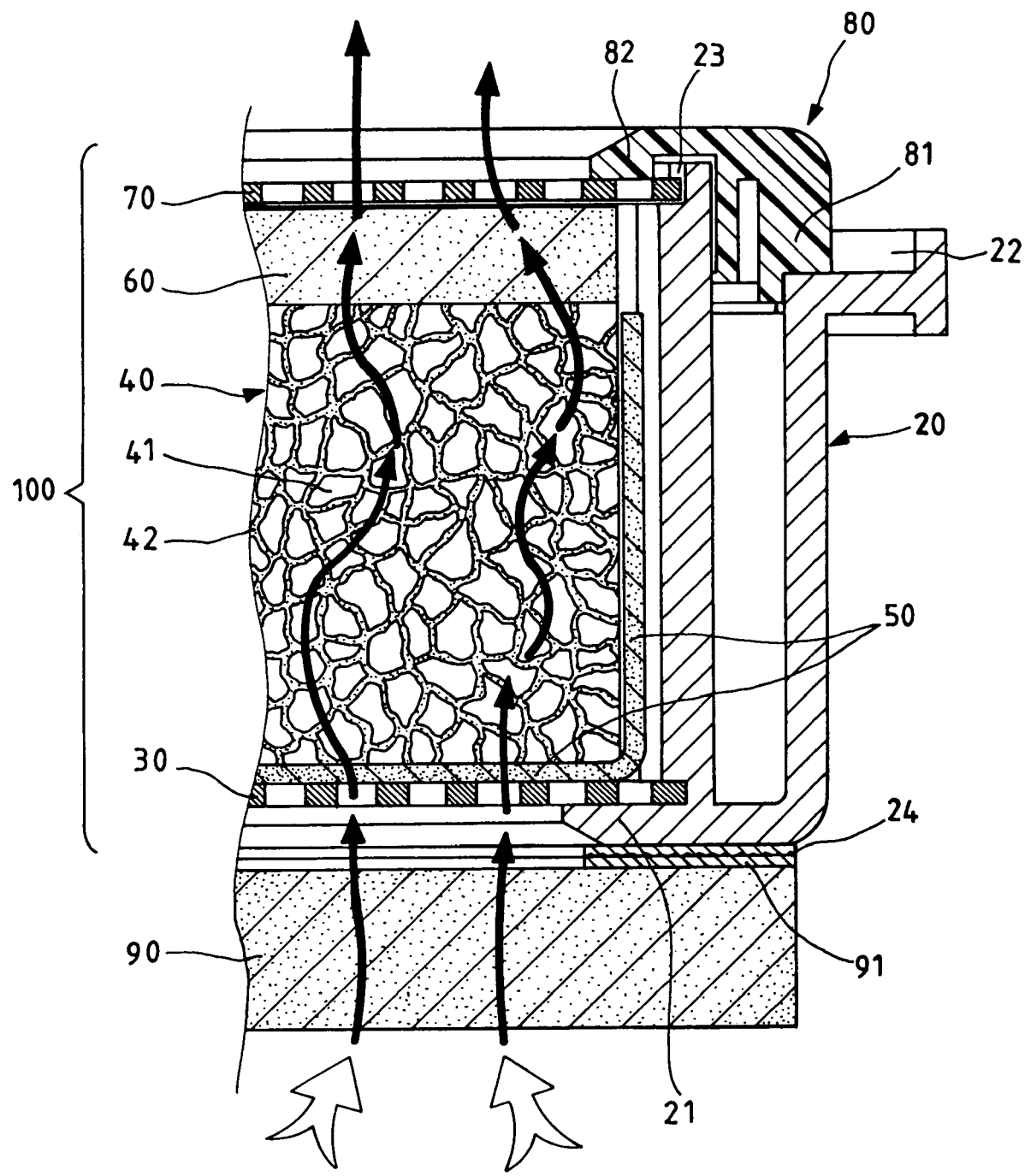
F I G. 5

APPARATUS WITH NANO-SIZED PLATINUM BLACK AND OXYGEN-RICH CERAMIC POWDER FOR FILTERING THE INCOMING AIR INTO AN INTERNAL COMBUSTION ENGINE

BACKGROUND OF THE INVENTION

1. Field of the Invention

The invention relates to an air filter for an internal combustion, and more particularly to an air filter with nano-sized platinum black and oxygen-rich ceramic powder for filtering the incoming air into an internal combustion engine.

2. Description of the Related Art

Air filters applied to cars are used for removing dust or impurities from incoming air into their internal combustion engines. As shown in FIG. 1, a conventional air filter 10 provides a corrugated filter element 12 within a filter case 11. The air passing through gaps of the corrugated filter element 12 will be filtered. However, this configuration of the corrugated filter element 12 has the following drawbacks:

1. The filter element 12 can only remove dust from the incoming air. However, it can't permit an activation of oxygen molecules within the incoming air.
2. The filter element 12 contains a number of fibers to which dust is attached so that it is subject to deformation, thereby affecting the air flow. Since it can't be washed, the whole air filter 10 has to be replaced, thereby creating additional maintenance cost.

SUMMARY OF THE INVENTION

It is a primary object of the invention to provide an air filter for an internal combustion engine having a rigid type ceramic filter element made by foaming oxygen-rich ceramic powder for creating a plurality of pass-through holes. So, the air filter has an increased filtering area and is not subject to deformation caused by the compression of air flow. So, an excellent filtering effect will be ensured by keeping a constant contact area. Moreover, the oxygen-rich ceramic is able to emit electronic micron waves and to release negative ions. Accordingly, the oxygen content of the incoming air into the internal combustion engine will be increased, thereby resulting in activation of the air and promotion of the air combustion efficiency.

It is another object of the invention to provide an air filter in which a nano-sized platinum black is applied or added to the ceramic filter element. In this way, the air passing through the ceramic filter element will be catalyzed in chemical reactions to divide the water molecule cluster into very fine particles. Meanwhile, the freedom of water molecule is increased to permit an instant decomposition of oxygen and nitrogen molecules, a complete combination with the fuel injected into the internal combustion engine, and a thorough mixing and a better combustion efficiency.

It is a further object of the invention to provide an air filter in which a few layers of sponge body are provided in addition to the ceramic filter element for removing dust and impurities from the incoming air. Meanwhile, the turbulence will be smoothed for reducing noise created by the action of the incoming air passing through the carburetor.

It is still another object of the invention to provide an air filter that is constructed as a rigid body and is detachable for easy cleaning and reuse. So, the maintenance cost can be diminished.

Thus, the increase of the combustion efficiency of the internal combustion engine will reduce the fuel consumption and enhance the horse power. Meanwhile, the poisonous gas like monoxide within the exhaust will be considerably diminished for the sake of our environment.

BRIEF DESCRIPTION OF THE DRAWINGS

The accomplishment of this and other objects of the invention will become apparent from the following descriptions and its accompanying drawings of which:

FIG. 3 is a perspective view of the air filter in accordance with the invention;

FIG. 5 is a partially enlarged view of FIG. 4.

DETAILED DESCRIPTION OF THE PREFERRED EMBODIMENT

Figure 1:
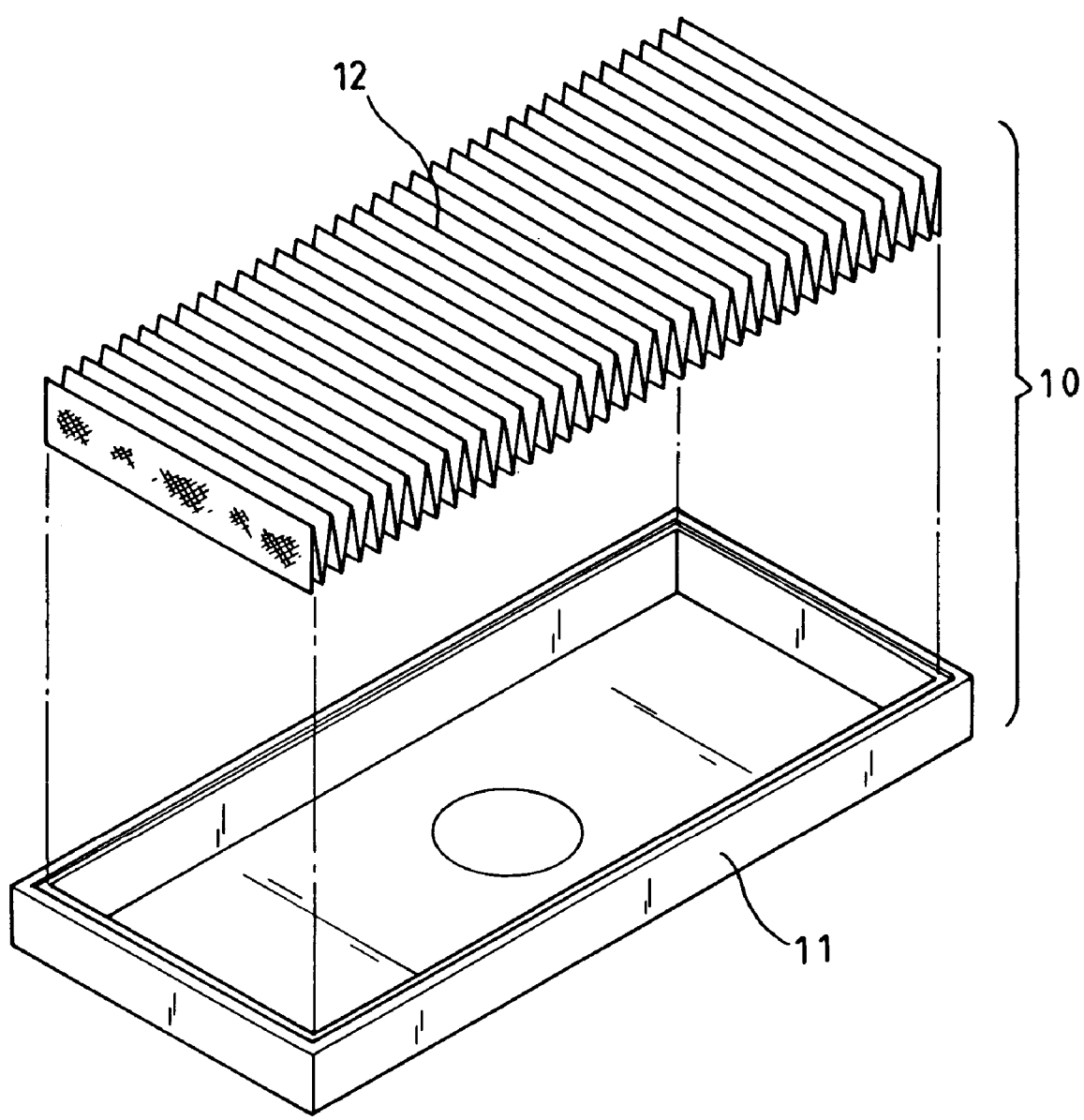
FIG. 1 is a perspective exploded view of a conventional air filter.
Figure 2:
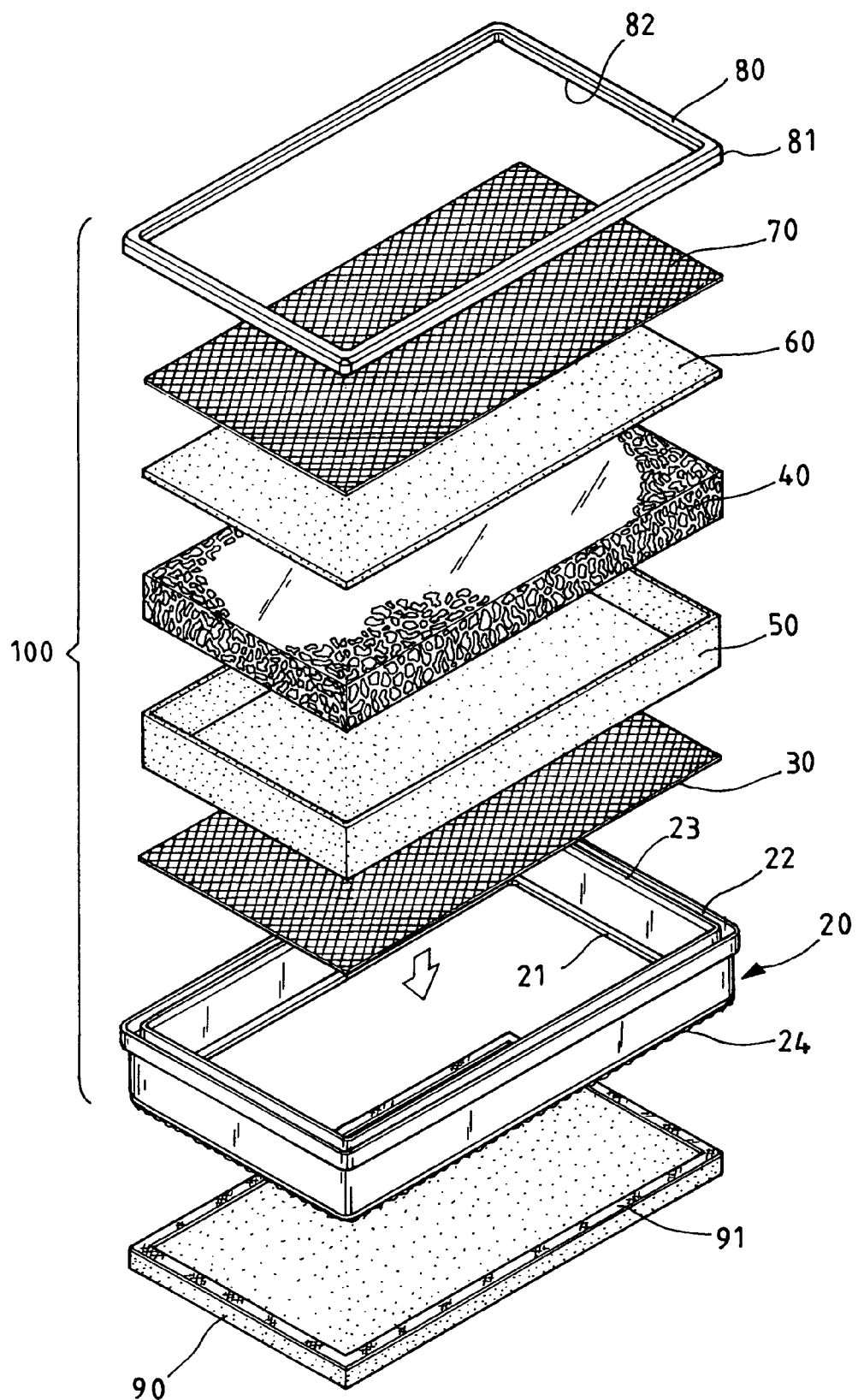
FIG. 2 is an exploded view of an air filter in accordance with the invention.
Figure 4:
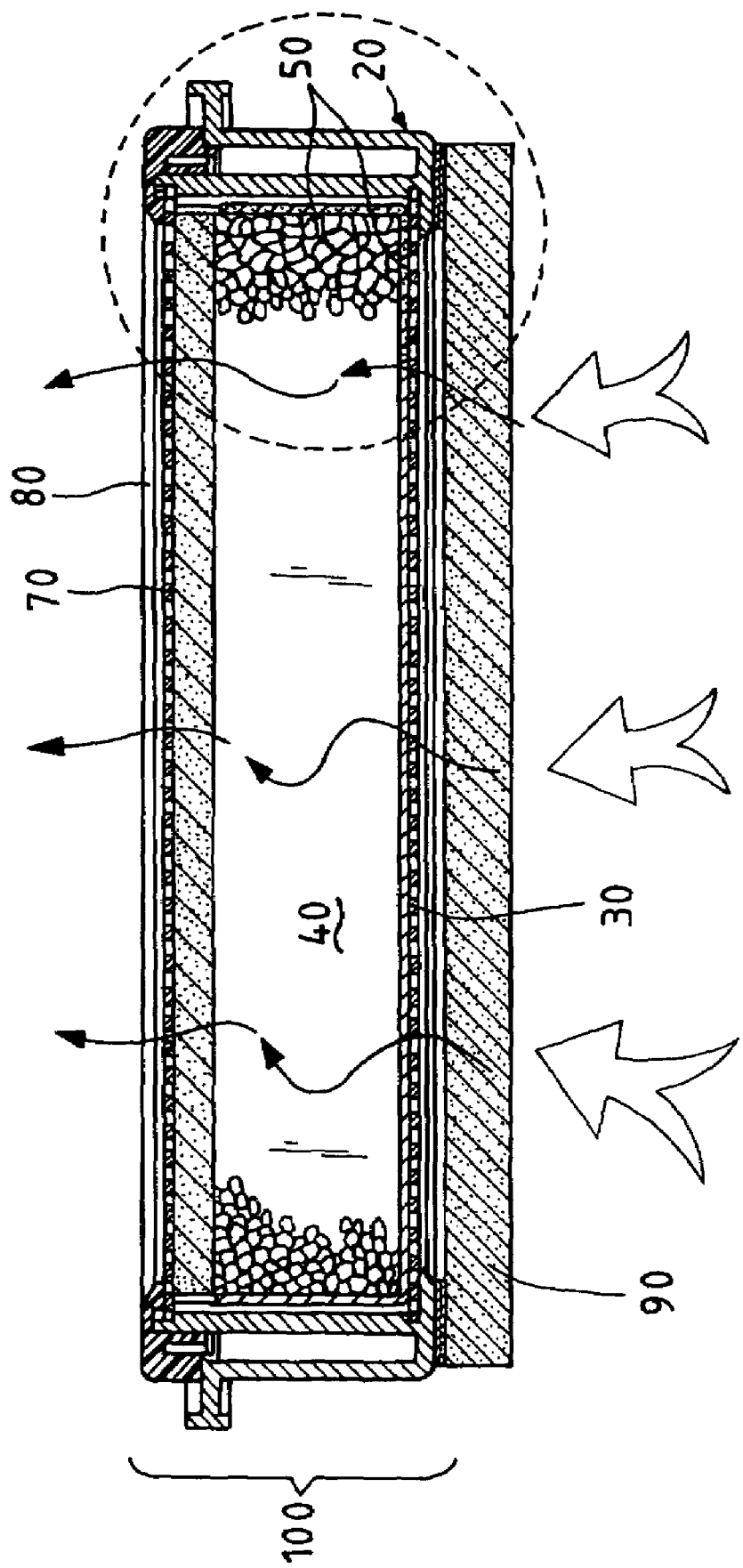
FIG. 4 is a cutaway view taken along the line 4-4 of FIG. 3.

First of all, referring to FIGS. 2 through 5, an air filter 100 in accordance with the invention includes a base 20, a lower metal net 30, a ceramic filter element 40, a lower cotton filter 50, an upper cotton filter 60, an upper metal net 70, and an upper frame 80.

The base 20 is constructed as a rectangular frame and includes a flange 21 projecting from the bottom inner edge thereof at right angles. Furthermore, the top rim of the base 20 is formed with an outer and an inner frame 22, 23.

The lower metal net 30 lies on the flange 21 of the base 20.

The ceramic filter element 40 is a rigid block filter made by foaming oxygen-rich ceramic powder and provided with a plurality of pass-through holes 41 shown in FIG. 5. Moreover, nano-sized platinum black is applied to the surface of the pass-through holes 41.

The lower cotton filter 50 accommodates the ceramic filter element 40 and lies together therewith on the lower metal net 30.

The upper cotton filter 60 is disposed on the surface of the ceramic filter element 40.

The upper metal net 70 lies on the upper cotton filter 60 and is enclosed by the inner frame 23 of the base 20.

The upper frame 80 includes an external and an internal rim 81, 82 that are respectively engaged with the outer and the inner frame 22, 23 of the base 20.

The above-mentioned components can be assembled to the air filter 100, as shown in FIG. 3. The lower metal net 30, the ceramic filter element 40, the lower cotton filter 50, the upper cotton filter 60, and the upper metal net 70 are overlapped to fit in the base 20 by use of the upper frame 80. Accordingly, they are integrated in a single body.

As shown in the figures, the upper frame 80 employs the flexibility of plastic or metallic material to be attached to the base 20. Therefore, it's easy to take out all components within the base 20 for cleaning or replacing purpose.

In order to enhance the dust-removing effect, a removable cotton filter 90 is attached to the bottom of the base 20 by use of Velcro fastening which consist of two strips 24, 91 of nylon fabric. A first strip 24 containing thousands of small hooks is secured to the bottom rim of the base 20 while the other strip 91 containing small loops is fastened on the top rim of the removable cotton filter 90. In this way, most of dust will be removed by the removable cotton filter 90 from the incoming air before the incoming air enters into the air filter 100. After the removable cotton filter 90 is used for a long period, it can be easily removed by tearing off the Velcro fastening for cleaning or replacing purpose. Since the lower cotton filter 50 and the upper cotton filter 60 are disposed in the air filter 100, the removable cotton filter 90 is optional. However, it's preferred to use the air filter 100 of the invention with the removable cotton filter 90.

Furthermore, the invention features the ceramic filter element 40. A plurality of the pass-through holes 41 is formed by foaming the oxygen-rich ceramic powder to which adhesive, foaming agent and stiffening agent are added. The pass-through holes 41 have irregular shapes and are positioned closely to each other for increasing the filtering area. In this way, the incoming air gains a thorough contact with the ceramic filter element 40. In addition, the foamed filter is rigid enough so that the pass-through holes 41 are not subject to deformation caused by the compression of air flow. So, an excellent filtering effect will be ensured by keeping a constant contact area. Besides, the ceramic filter element 40 is made by foaming the oxygen-rich ceramic powder which is formed by mixing and sintering zirconium oxide ($Z_rO_2$), alumina ($Al_2O_3$), and kaolinite, and the sintered mixture thereof will be then ground to the nano-sized powder. This kind of powder has the function of releasing negative ions. The oxygen content will be increased when this material is in contact with air, thereby resulting in activation of the air and promotion of the air combustion efficiency. The effect to provide the incoming air with oxygen is limited only by employing the ceramic filter element 40 made by foaming the oxygen-rich ceramic powder for releasing the negative ions. The reason for that lies in that the speed of incoming air is very high and it's much difficult for the air filter to decompose oxygen and nitrogen molecules within a very short time. So, the invention employs a nano-sized platinum black which is applied or added to the ceramic filter element 40. In order to obtain an optimal efficiency, the platinum black 42 is coated to the surface of the pass-through holes 41 in evaporating or sputtering process well-known in the semiconductor field. This is an optimal solution to permit a thorough contact with the incoming air. It has been proven from scientific and technical literature that platinum black has a catalyzing effect on the surface of water molecules. In other words, the water $2H_2O$ can be divided into $2H_2$ and $O_2$ by use of platinum black as a catalyst. When the metallic platinum is divided into nano-sized black powder of platinum, it is considered to be excellent water catalyst due to the large surface area and the excellent activation effect of the nano-sized particles. So, the reaction efficiency will be much improved. And the incoming air passing through the pass-through holes 41 of the ceramic filter element 40 is catalyzed in chemical reactions to divide the water molecule cluster into smaller particles. Meanwhile, the freedom of water molecule is increased to permit an instant decomposition of oxygen and nitrogen molecules, a complete combination with the fuel injected into the internal combustion engine, and a thorough mixing and a better combustion efficiency.

The increase of the combustion efficiency of the internal combustion engine will reduce the fuel consumption and enhance the horse power. Meanwhile, the poisonous gas like monoxide within the exhaust will be considerably diminished for the sake of our environment.

Many changes and modifications in the above-described embodiment of the invention can, of course, be carried out without departing from the scope thereof. Accordingly, to promote the progress in science and the useful arts, the invention is disclosed and is intended to be limited only by the scope of the appended claims.

What is claimed is:

1. An apparatus with nano-sized platinum black and oxygen-rich ceramic powder for filtering the incoming air into an internal combustion engine, the apparatus comprising:
   a) a base constructed as a rectangular frame, the base having a flange projecting from the bottom inner edge thereof at right angles, a top rim of the base being formed with an outer and an inner frame;
   b) a lower metal net lying on the flange of the base;
   c) a ceramic filter element containing ($ZrO_2$), $Al_2O_3$ and kaolinite, and a means for activating oxygen molecules in the air incoming into the internal combustion engine, said ceramic filter element being a rigid block filter made by foaming oxygen-rich ceramic powder and provided with a plurality of pass-through holes, nano-sized platinum black being applied to the surface of the pass-through holes;
   d) a lower cotton filter accommodating the ceramic filter element and positioned together therewith on the lower metal net;
   e) an upper cotton filter disposed on the surface of the ceramic filter element;
   f) an upper metal net lying on the upper cotton filter, the upper metal net being enclosed by the inner frame of the base; and
   g) an upper frame having an external and an internal rim that are respectively engaged with the outer and the inner frame of the base.

2. The air filter as recited in claim 1, further comprising a removable cotton filter and a hook and loop fastening mechanism for securing said removable cotton filter to said base, said hook and loop fastening mechanism including a first strip and a second strip couplable each to the other, wherein said first strip is attached to the bottom of the base, and wherein said second strip is attached to a corresponding surface of said removable cotton filter.

3. The air filter as recited in claim 2, wherein the first and the second strips of the fastening mechanism include hook elements and loop elements respectively.

4. The air filter as recited in claim 1, wherein the oxygen-rich ceramic powder is formed by mixing and sintering zirconium oxide (ZrO2), alumina ($Al_2O_3$), and kaolinite, the sintered mixture thereof being ground, thereby forming a nano-sized powder.

5. The air filter as recited in claim 1, wherein the platinum black is coated to the surface of the pass-through holes of the rigid ceramic filter element by evaporating or sputtering process.

* * * * *